(12) United States Patent
Tateno et al.

(10) Patent No.: US 8,254,053 B2
(45) Date of Patent: Aug. 28, 2012

(54) CARTRIDGE CARRYING APPARATUS AND CARTRIDGE CARRYING METHOD USING NOTCH-ENGAGEMENT PROJECTION

(75) Inventors: Takeshi Tateno, Tokyo (JP); Yoshimi Hirose, Tokyo (JP)

(73) Assignee: NEC Corporation, Tokyo (JP)

( * ) Notice: Subject to any disclaimer, the term of this patent is extended or adjusted under 35 U.S.C. 154(b) by 1075 days.

(21) Appl. No.: 12/175,637

(22) Filed: Jul. 18, 2008

(65) Prior Publication Data

US 2009/0027804 A1 Jan. 29, 2009

(30) Foreign Application Priority Data

Jul. 27, 2007 (JP) ................................ 2007-196653

(51) Int. Cl.
*G11B 15/68* (2006.01)
(52) U.S. Cl. .................................... 360/92.1; 360/96.51
(58) Field of Classification Search .................. 360/92.1, 360/98.06, 96.51; 720/633, 641, 642; 369/30.43, 369/30.49, 30.7, 30.72
See application file for complete search history.

(56) References Cited

U.S. PATENT DOCUMENTS 6,515,945 B2 2/2003 Suzuki et al.

FOREIGN PATENT DOCUMENTS

| JP | 1974025884 A | 7/1974 |
| JP | 1982015466 A | 1/1982 |
| JP | 02046945 U | 3/1990 |
| JP | 4-006852 A | 1/1992 |
| JP | 04364263 A | 12/1992 |
| JP | 1999259951 A | 9/1999 |

OTHER PUBLICATIONS

Japanese Office Action for JP2007-196653 issued on Jun. 16, 2009.
Japanese Office Action for JP2007-196653 issued on Aug. 4, 2009.
German Office Action for DE10 2008 035 441.4-55 issued on Dec. 13, 2010.

*Primary Examiner* — Jefferson Evans

(57) ABSTRACT

To provide a magnetic tape loader with which undesirable slippage does not occur while a cartridge is inserted/ejected and carried, whose configuration is simple, and capable of being produced at a low cost. While a projection on an endless belt wrapped around pulleys is engaged with a notch section formed in a front end face of the cartridge in a rack, wherein the pulleys are provided within a cartridge housing container along a cartridge inserting/ejecting direction and having an interval in between, the pulleys and the endless belt are driven to rotate so that the projection slides and the cartridge is pulled out from the rack or a magnetic tape drive. Then the cartridge is housed in the cartridge housing container. The pulley and the endless belt are driven to rotate in reverse so that the projection slides to insert the cartridge from the cartridge housing container into the rack or the magnetic tape drive.

10 Claims, 12 Drawing Sheets

CARTRIDGE CARRYING APPARATUS AND CARTRIDGE CARRYING METHOD USING NOTCH-ENGAGEMENT PROJECTION

CROSS-REFERENCE TO RELATED APPLICATION

This application is based upon and claims the benefit of priority from Japanese patent application No. 2007-196653, filed on Jul. 27, 2007, the disclosure of which is incorporated herein in its entirety by reference.

BACKGROUND OF THE INVENTION

1. Field of the Invention

The present invention relates to improvement of a cartridge carrying apparatus and a cartridge carrying method for transferring a cartridge incorporating a magnetic tape and the like between a rack and a storage playback device such as a magnetic tape drive and the like.

2. Description of the Related Art

As for a cartridge carrying apparatus for transferring a cartridge between a rack which houses aligned cartridges incorporating a storage medium and a storage playback device, a cartridge tape carrier mechanism disclosed in Japanese Patent Application Laid-open No. 04-364263 (Patent Document 1) and a cartridge feeding mechanism disclosed in Japanese Utility Model Application Laid-open No. 02-46945 (Patent Document 2) are already known.

The cartridge tape carrier mechanism disclosed in Patent Document 1 includes a configuration where two sets of feed belt assemblies each of which has feed belts are disposed to be faced to each other, and a cartridge is pressed at its both sides to be fed while oscillation angles and an interval of the feed belt assemblies are being adjusted according to a position where the cartridge is being fed. Accordingly, the assemblies require many oscillation members, many rotation members, and also feed belts. Therefore, it is disadvantageous that a structure of the device and an adjustment work at each section become complicated, and a production cost rises high.

Further, because cartridge insertion/ejection openings of the magnetic tape drive and the rack are arranged to be faced to each other, it is also difficult for the device to be downsized.

The cartridge feeding mechanism disclosed in Patent Document 2 has a simpler structure compared to the cartridge tape carrier mechanism disclosed in Patent Document 1. However, the mechanism includes a structure where members having large frictional resistance are provided on a surface of the feed belt, and a cartridge is pressed from its both sides to be fed, so that two feed belts are still necessary to be arranged symmetrically at both sides of the cartridge. Note that this cartridge feeding mechanism is specialized for sending/receiving a cartridge between a magnetic tape drive and a handler, and it is not for sending/receiving a cartridge between a rack and a handler.

Above mentioned cartridge tape carrier mechanism and the cartridge feeding mechanism have a structure in which a cartridge is clipped with being pressed and fed. Therefore, if slippage occurs between a feed belt or a member on the surface of feed belt and a surface of a cartridge, it becomes difficult to insert/eject or carry the cartridge well, and a motor for driving the feed belts may lose synchronism.

Further, two sets of conveyance units such as feed belts and the like are required to be provided symmetrically at both sides of a cartridge. Therefore, there are such disadvantages that the structure becomes complicated, an adjustment work becomes not easy to be performed, and it becomes difficult to downsize the device.

In addition, there is a magnetic tape loader also proposed in which a picker formed in a hook shape is engaged with a notch section of a cartridge so as to pull out the cartridge from the rack. However, in this sort of devices, the picker is necessary to be removed from the notch section of a cartridge, so that a stay or a pivot to support the picker swingably, also an operation pole or a spring and the like to swing the picker are required. Therefore, as well as the above case, there is such a disadvantage that a structure of the devices becomes complicated.

Specifically, if it has a structure in which a picker approaches a cartridge from a front side and engages with the notch section formed in a side of the cartridge, a pivot shaft and a drive source need to be disposed in a front side of a cartridge, therefore, a cartridge housing container whose size in an inserting/ejecting direction is exceeding a depth of a cartridge is required. It is disadvantageous in that the cartridge carrying apparatus is enlarged in its depth.

SUMMARY OF THE INVENTION

Therefore, an exemplary object of the invention is to provide a cartridge carrying apparatus and a cartridge carrying method with which an unconsidered slippage does not occur when a cartridge is inserted/ejected or carried, a structure of which becomes simple, so that it is capable of being produced at a low cost, and in particular, a depth of the device in the cartridge inserting/ejecting direction can be shorten, and assembly and adjustment works become easy to be performed.

A cartridge carrying apparatus according to an exemplary aspect of the invention is the apparatus traveling reciprocatory between a rack which houses aligned cartridges incorporating a storage medium and a storage playback device which is disposed near the rack, so as to carry a cartridge. To achieve the above described object, the cartridge carrying apparatus includes, specifically: a cartridge housing container disposed so as to be capable of traveling between a position in front of the rack and a position in front of the storage playback device to approach the cartridge insertion/ejection openings of the rack and the storage playback device, including an opening in a surface facing the rack and the storage playback device; two rotating bodies set at outside a projection plane of the cartridge, disposed within the cartridge housing container along an inserting/ejecting direction of the cartridge, with having an interval between the rotating bodies; a circular body wrapped around the rotating bodies with having substantial flexibility; a projection, fixed on a surface of the circular body for being engaged with a notch section formed in a front end portion of the cartridge which is to be ejected from the rack or the storage playback device, with being positioned on an outer circumference of the rotating body so as to be capable of being close to the cartridge insertion/ejection openings of the rack and the storage playback device; a rotating body driving unit for driving rotation of at least one of the rotating bodies; and a container driving unit for transferring the cartridge housing container between the rack and the storage playback device.

Further, a cartridge carrying method according to another exemplary aspect of the invention is the method for inserting/ejecting a cartridge to/from each cartridge insertion/ejection opening of a rack which houses aligned cartridges incorporating a storage medium and a storage playback device, and to achieve the same object as described above, the cartridge carrying method includes: disposing a circular body in front of a cartridge insertion/ejection opening, at outside a projection plane of the cartridge, the circular body having a projection on a surface thereof, moving along a long ellipse shaped track extending in an inserting/ejecting direction for the cartridge, with having a substantial flexibility; moving the circular body in such a direction that the projection slides in the ejecting direction of the cartridge from the position at a half arc portion of the long ellipse shaped track near the cartridge insertion/ejection opening, and engaging the projection with a notch section formed in a nearer side end portion of the cartridge projecting from the cartridge insertion/ejection opening so as to take out the cartridge from the cartridge insertion/ejection opening and carry it out along a linear portion of the long ellipse shaped track; and moving the circular body in such a direction that the projection on the linear portion of the long ellipse shaped track slides in the inserting direction of the cartridge, and moving and feeding the cartridge by the projection engaged with the notch section to insert the cartridge into the cartridge insertion/ejection opening, and then removing the projection from the notch section.

DESCRIPTION OF EXEMPLARY EMBODIMENTS

An exemplary embodiment will be explained with reference to the drawings, wherein the exemplary embodiment is in a case where a cartridge carrying apparatus of an exemplary aspect of the invention is applied to a magnetic tape loader in a magnetic tape library.

Figure 1:
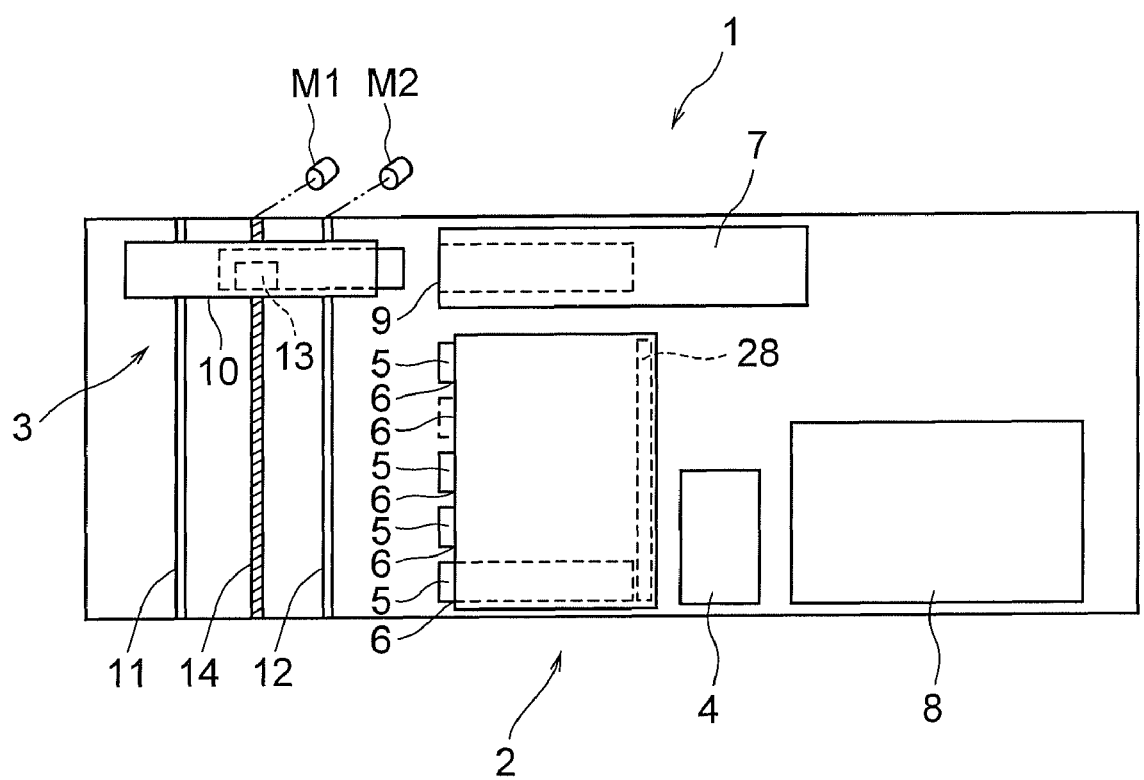
FIG. 1 is a sectional side view showing a simplified overall construction of a magnetic tape library equipped with a magnetic tape loader (a cartridge carrying apparatus) of an exemplary embodiment applied with an exemplary aspect of the invention.
Figure 2:
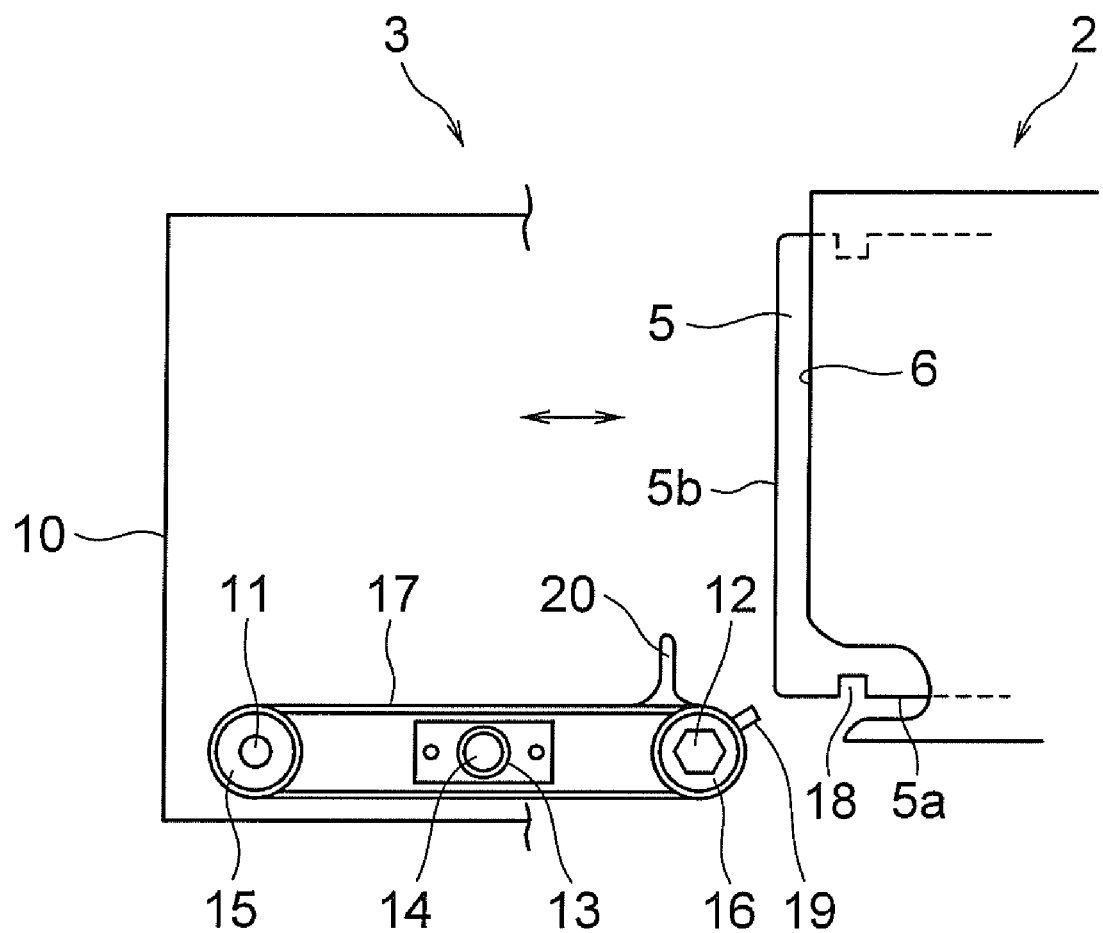
FIG. 2 is a partial plan sectional view showing a positional relationship between a rack and the magnetic tape loader disposed in the magnetic tape library.
Figure 3:
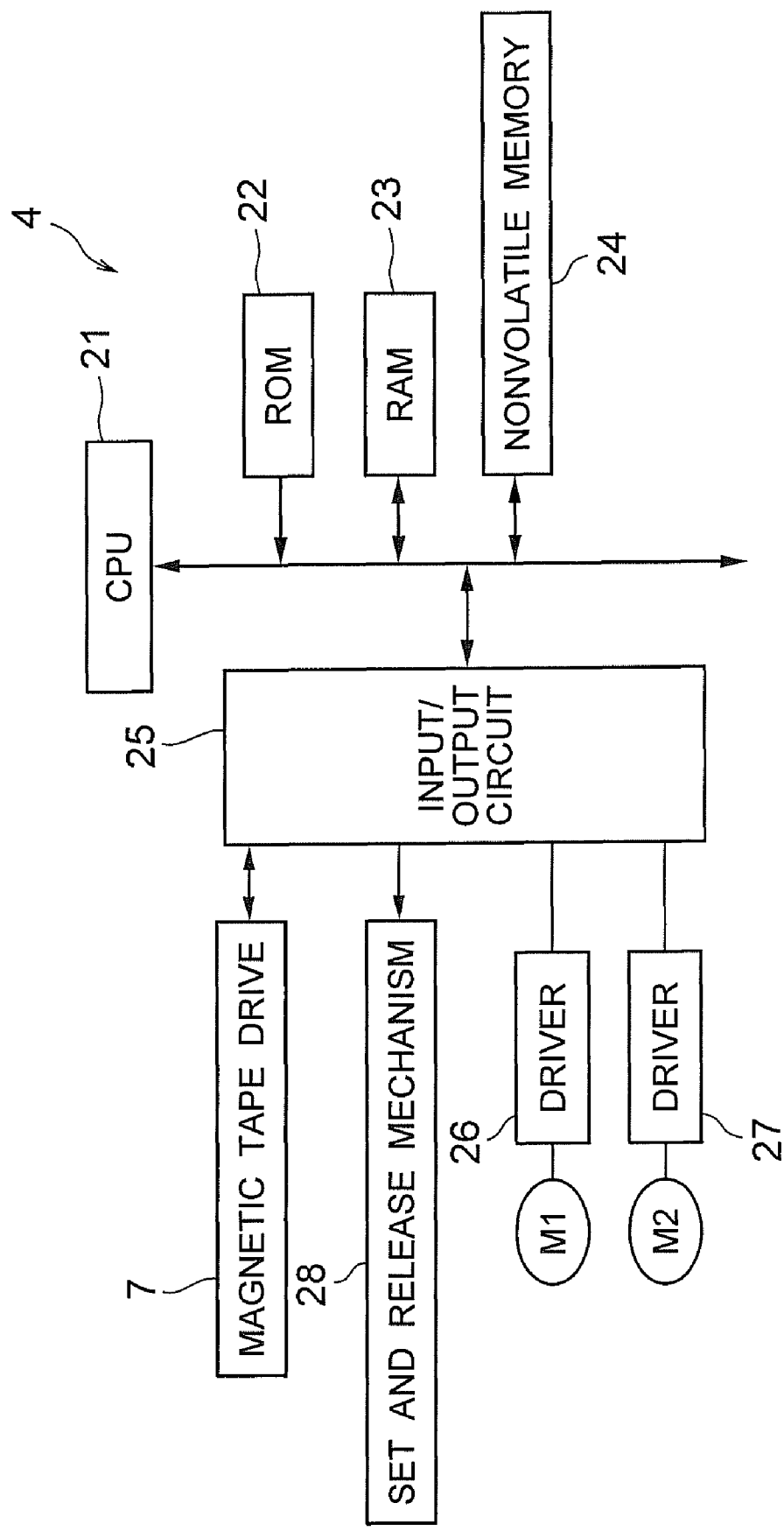
FIG. 3 is a block diagram showing an overall construction of a controller for drive control of the magnetic tape loader.

FIG. 1 is a sectional side view showing a simplified overall construction of a magnetic tape library 1 equipped with a magnetic tape loader according to an exemplary embodiment. FIG. 2 is a partial plan sectional view showing a positional relationship between a rack 2 and a magnetic tape loader 3 disposed in the magnetic tape library 1. FIG. 3 is a block diagram showing an overall construction of a controller 4 for drive control of the magnetic tape loader 3.

A main portion of the magnetic tape library 1 includes, as shown in FIG. 1, a rack 2, a plurality of cartridge insertion/ejection openings 6 for housing cartridges 5 incorporating a magnetic tape, which is a sort of storage media, aligned in a thickness direction; a magnetic tape drive 7 being a storage playback device, disposed at above the rack 2 along the alignment direction of the cartridges 5; the magnetic tape loader 3 being the cartridge carrying apparatus traveling reciprocatory between the rack 2 and the magnetic tape drive 7 to carry the cartridge 5; the controller 4 for drive-controlling the magnetic tape loader 3; and a electric source unit 8 for supplying driving power to the magnetic tape drive 7 and the magnetic tape loader 3.

The rack 2 and the magnetic tape drive 7 are provided with the cartridge insertion/ejection openings 6 and 9 at the left surfaces thereof respectively, as shown in FIG. 1, and a cartridge housing container 10 configuring the main portion of the magnetic tape loader 3 approaches the cartridge insertion/ejection openings 6 and 9 of the rack 2 and the magnetic tape drive 7 so as to be positioned in front of them, that is, in a left side of the rack 2 and the magnetic tape drive 7 in FIGS. 1 and 2.

The cartridge housing container 10 is guided by two guide rods 11 and 12 extending in a vertical direction, as shown in FIG. 1, so as to travel flexibly in the alignment direction of the cartridges 5, that is, in the vertical direction in FIG. 1. The cartridge housing container 10 is fed in the vertical direction in FIG. 1 along the alignment direction of the rack 2 and the magnetic tape drive 7 by rotation of a ball screw 14 which penetrates into a ball nut 13 fixed inside the cartridge housing container 10 and screwed thereto.

Therefore, a container driving unit in this exemplary embodiment is composed of the ball nut 13, the ball screw 14, and motor M1 for driving rotation of the ball screw 14.

The cartridge housing container 10 is, as shown in FIG. 2, a box-shaped member having one surface facing to the rack 2 and the magnetic tape drive 7 being opened. In the cartridge housing container 10, two rotating bodies of pulleys 15, 16 are supported by the guide rods 11, 12 which are two rotation shafts, the guide rods 11, 12 being provided along the inserting/ejecting direction for the cartridge 5 indicated by a two-headed arrow in FIG. 2, having an interval equivalent to an entire length in the inserting/ejecting direction for the cartridge 5, and being provided parallel to a thickness direction of the cartridge 5, that is, along a vertical direction on the figure.

Two of the pulleys 15 and 16 are disposed, as shown in FIG. 2, outside the projection plane of the cartridge 5 in the inserting/ejecting direction, more specifically, outside an end face 5a facing in a width direction of the cartridge 5, that is, a slightly downward position from the end face 5a on the figure.

One pulley 16 of two pulleys 15, 16 functions as a driving pulley, and is attached on the hexagonal guide rod 12 slidably in an axial direction and unrotatably. The other pulley 15 is attached on the cylindrical guide rod 11 slidably in an axial direction and also rotatably.

Therefore, if the motor M1 drives rotation of the ball screw 14 to feed the cartridge housing container 10 along the alignment direction of the rack 2 and the magnetic tape drive 7 through the ball nut 13, the pulleys 15 and 16 move in the alignment direction of the rack 2 and the magnetic tape drive 7 together with the cartridge housing container 10 in an unrotating state.

Further, if the motor M1 is stopped and the guide rod 12 is rotated by a motor M2, the cartridge housing container 10 and the pulleys 15, 16 stay at those positions, and the pulley 16 is rotated together with the guide rod 12.

Namely, the rotation body driving unit in this exemplary embodiment is composed of the guide rod 12 and the motor M2.

Those pulleys 15 and 16 are wrapped by a circular body made from synthetic rubber or flexible plastic and the like, such as an endless belt 17. The endless belt 17 has a projection 19 and an auxiliary projection 20 formed longer than the projection 19, which are fixed on a surface of the endless belt 17. The endless belt 17 wrapped around the pulleys 15 and 16 draws a long ellipse shaped track extending toward the inserting/ejecting direction of the cartridge 5, that is, a long ellipse shaped track which is elongated in a right and left direction in FIG. 2.

Figure 8:
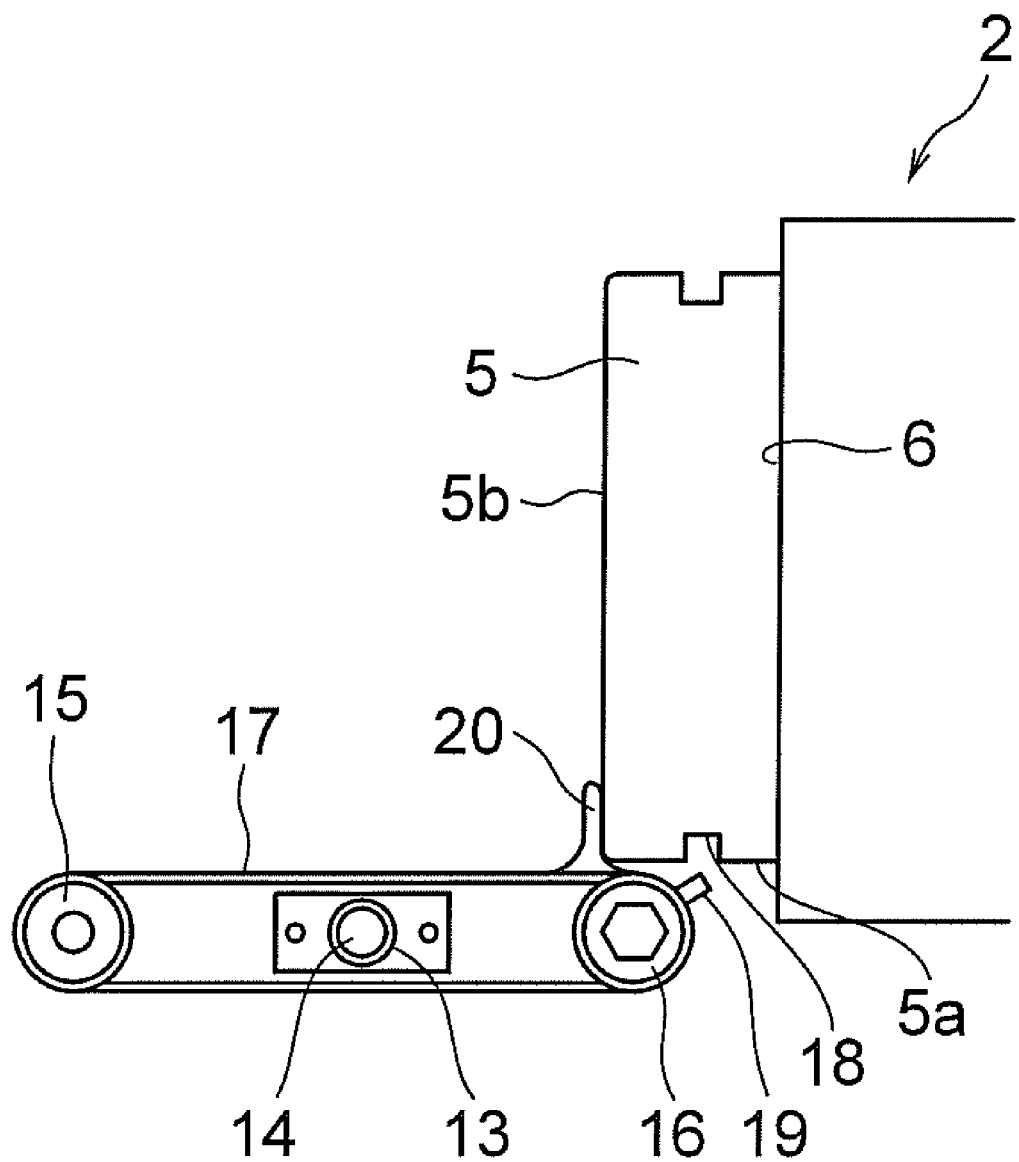
FIG. 8 is a diagram of an action principle showing a state where a cartridge is released and pushed out to a cartridge delivery position of the rack, and then a projection on an endless belt starts to be engaged with a notch section formed in a front end section of the cartridge.

As shown in FIG. 8, while the projection 19 is positioned on an outer circumference of the pulley 16 near the cartridge insertion/ejection opening 6 or 9 of the rack 2 or the magnetic tape drive 7, that is, the projection 19 is positioned at a half arc portion in a closer side to the cartridge insertion/ejection opening 6 or 9 of a long ellipse shaped track, and the auxiliary projection 20 is positioned at a linear portion of the long ellipse shaped track, the projection 19 is engaged with a notch section 18 formed at the nearer end portion in the cartridge 5, more specifically, in the nearer side of the end face 5a facing in the width direction of the cartridge 5 which is to be ejected from the magnetic tape drive 7, and the auxiliary projection 20 comes into contact with an end face 5b in the front side of the cartridge 5 facing in the inserting/ejecting direction.

In this case, the projection 19 and the auxiliary projection 20 may be formed integrally with the endless belt 17, or may be formed as separated members and fixed on the endless belt 17 with some measure such as adhesion. Further, it is desirable that the pulley 16 and the endless belt 17 have a wheel tooth so as to prevent them from slipping on each other.

The controller 4 for drive control of the magnetic tape loader 3 includes, as shown in FIG. 3, a CPU 21 for arithmetic processing; a ROM 22 storing a control program for the CPU 21; a RAM 23 to be used for such as temporary storage for data in a calculating process; and a nonvolatile memory 24 for storing various parameters and the like; and controls drive of the motor M1 composing a main portion of the container driving unit in the magnetic tape loader 3 and the motor M2 composing a main portion of the rotating driving unit in the magnetic tape loader 3, through an input/output circuit 25 and drivers 26, 27.

Further, the rack 2 of this exemplary embodiment is provided with a set and release mechanism 28 for pulling the cartridge 5 inserted in each cartridge insertion/ejection opening 6 into a lock position within the cartridge insertion/ejection opening 6, and for releasing the cartridge 5 fixed at the lock position and pushing out it to a delivery position. The set and release mechanism 28 is controlled to drive by a command issued from the CPU 21 through the input/output circuit 25. The set and release mechanism 28 is already known and may have any configuration.

FIG. 2 shows a state where the cartridge 5 inserted in the insertion/ejection opening 6 is completely pulled in the lock position within the cartridge insertion/ejection opening 6. FIG. 8 shows a state where the cartridge 5 is released and pushed out to the delivery position for the cartridge 5. The projection 19 of the endless belt 17 is engaged with the notch section 18 formed in the nearer side section in the end face 5a facing in the width direction of the cartridge 5 when the cartridge 5 is pushed out to the delivery position in the rack 2 or the magnetic tape drive 7, as shown in FIG. 8. At that time, the projection 19 of the endless belt 17 is positioned on the outer circumference of the pulley 16, that is, on the half arc portion of the long ellipse shaped track at the closer side to the cartridge insertion/ejection opening 6 and 9, and a tip of the projection 19 is placed slightly outside the projection plane of the cartridge 5 so as to be along the radial direction of the pulley 16, that is, placed slightly downward in FIG. 8 so as not to touch the end face 5a facing in the width direction of the cartridge 5. FIGS. 2 and 8 show initial positions of the projection 19 and the auxiliary projection 20.

The magnetic tape drive 7 is connected to a higher-level device, such as a personal computer, a work station, and the like through an unillustrated interface, and mounts any one of the cartridges 5 in the rack 2 depending on a mount command issued from the higher-level device so as to perform read-out/write-in data from/to a magnetic tape within the cartridge.

The magnetic tape drive 7 is also connected to the CPU 21 of the controller 4 through the input/output circuit 25. When the magnetic tape drive 7 detects a mount command issued from the higher-level device, positional information about the cartridge insertion/ejection opening 6 which houses a cartridge 5 to be mounted (an address in the rack 2) is sent from the magnetic tape drive 7 to the CPU 21.

The magnetic tape drive 7 also has a function of pulling the cartridge 5 inserted in the cartridge insertion/ejection opening 9 into the mounting position, releasing the cartridge 5 fixed at the mounting position to push out it to the delivery position, as well as the rack 2 mentioned above.

Figure 4:
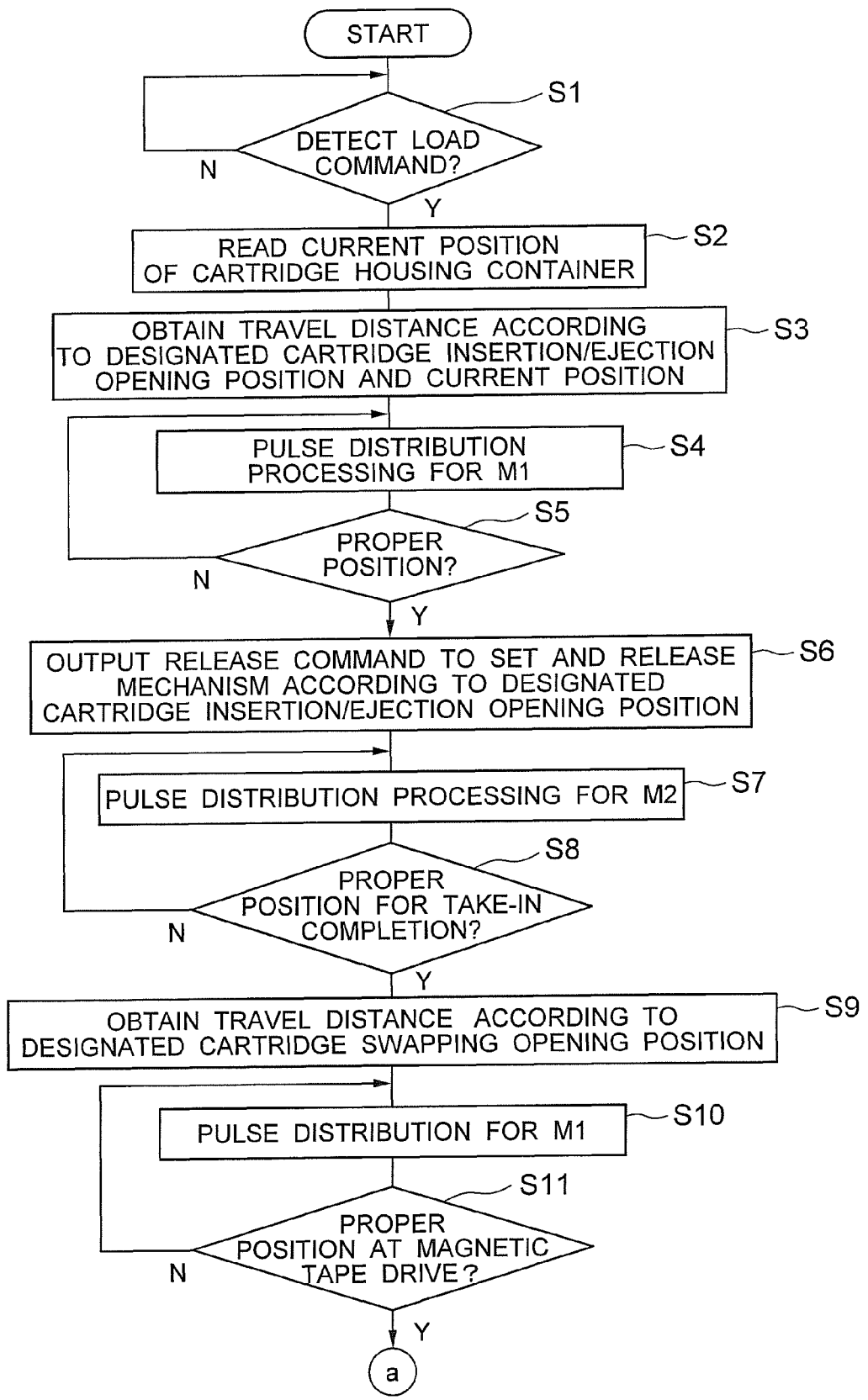
FIG. 4 is a flowchart showing overall drive control for the rack and the magnetic tape loader by the controller of the exemplary aspect of the invention.
Figure 5:
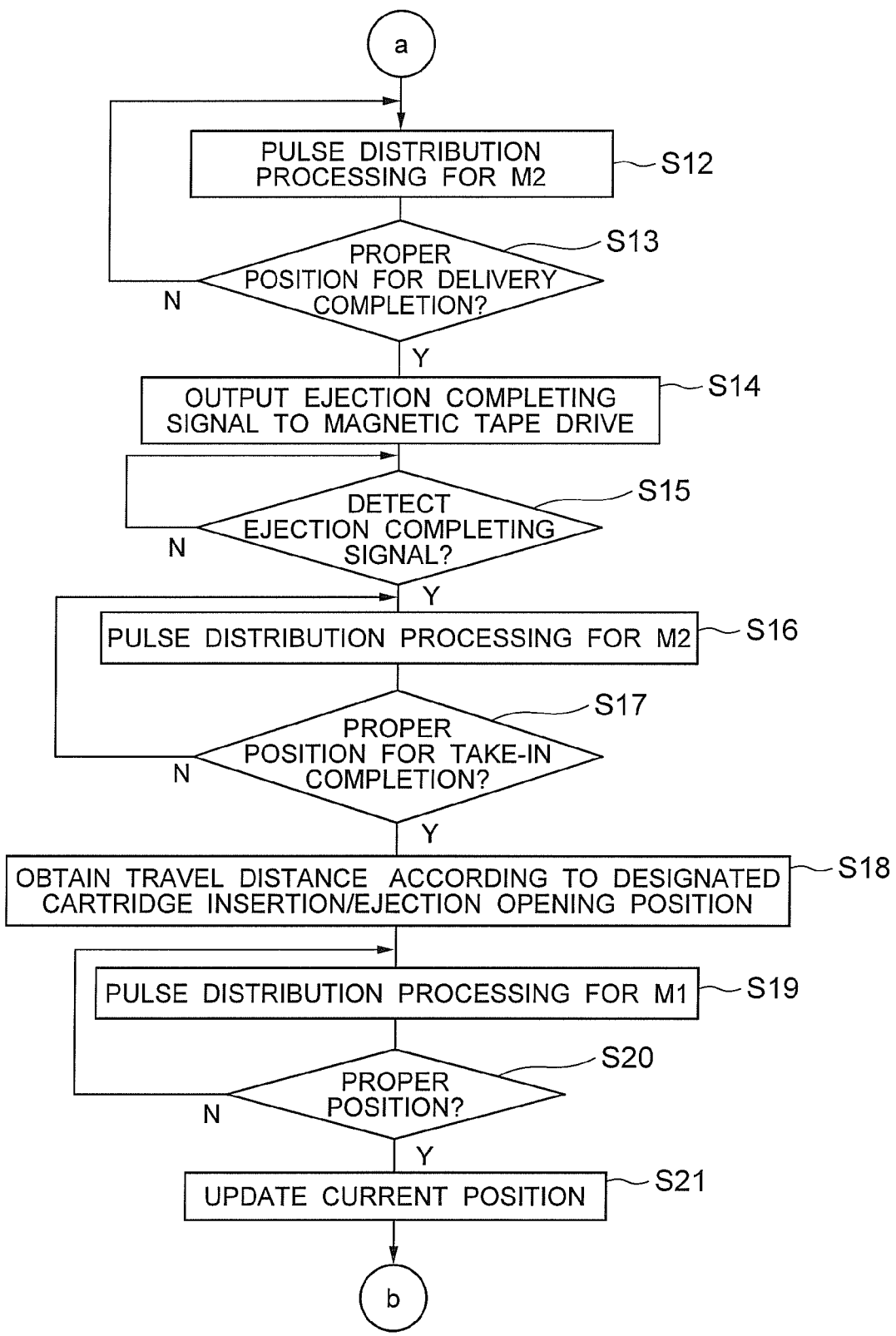
FIG. 5 is a sequential flowchart showing the overall drive control for the rack and the magnetic tape loader by the controller of the exemplary aspect of the invention.
Figure 6:
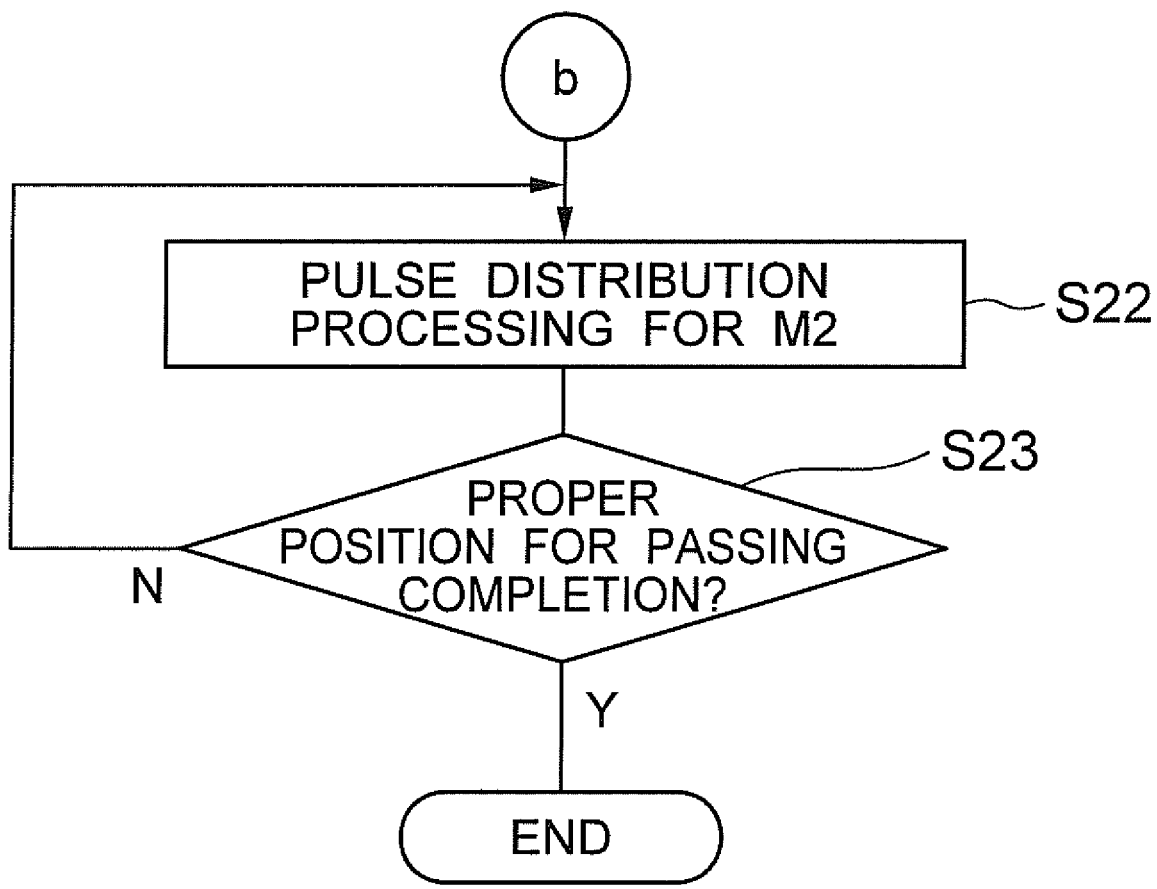
FIG. 6 is a sequential flowchart showing the overall drive control for the rack and the magnetic tape loader by the controller of the exemplary aspect of the invention.

FIGS. 4-6 is flowcharts showing overall drive control with respect to the magnetic tape loader 3 performed by the controller 4 in the exemplary aspect of the present invention.

Next, overall processing operation of the magnetic tape library 1 will be explained specifically with reference to FIGS. 4-6.

When a mount command is inputted into the magnetic tape loader 7 from an unillustrated higher-level device such as a personal computer or a work station, a load command is inputted into the CPU 21 of the controller 4 through the input/output circuit 25 from the magnetic tape loader 7. The load command includes the positional information on the cartridge insertion/ejection opening 6 housing a cartridge 5 to be mounted (the address in the rack 2).

When an input of the load command is detected (Step S1), the CPU 21 of the controller 4 firstly reads a current position of the cartridge housing container 10 from a current position storing register of the nonvolatile memory 24 (Step S2). According to the current position of the cartridge housing container 10 and the positional information on the cartridge insertion/ejection opening 6 indicated by the load command, the CPU 21 obtains a rotational direction for the motor M1 and a number of drive command pulses, which are required for transferring the cartridge housing container 10 from the current position to a position of the designated cartridge insertion/ejection opening 6 (Step S3).

Then, a pulse distribution processing starts with respect to the motor M1 functioning as a container driving unit, and the ball screw 14 is driven to rotate so as to feed the ball nut 13, and then the cartridge housing container 10 travels along the two guide rods 11 and 12 in the alignment direction of the cartridges 5, that is, in the vertical direction in FIG. 1 (Steps S4-S5/a cartridge obtaining approach control).

At that time, the projection 19 and the auxiliary projection 20 on the endless belt 17 are positioned at such initial positions as shown in FIG. 2 or 8, and all cartridges 5 housed in the rack 2 are drawn into the lock position inside the cartridge insertion/ejection opening 6, as shown in FIG. 2. Therefore, even if the cartridge housing container 10 travels in the alignment direction of the cartridges 5, that is, in the vertical direction in FIG. 1, a tip of the projection 19 or the auxiliary projection 20 does not touch the cartridge 5.

When the pulse distribution processing is complete and the cartridge housing container 10 reaches a position within a proper range at the designated cartridge insertion/ejection opening 6, the CPU 21 of the controller 4 outputs a cartridge release command to the set and release mechanism 28 of the rack 2 according to the positional information on the cartridge insertion/ejection opening 6 designated by the load command, and makes a head of the cartridge 5 which is to be loaded project from the cartridge insertion/ejection opening 6 into the delivery position (Step S6).

Accordingly, the end face 5b in the nearer side of the cartridge 5 pushed out is pressed on the auxiliary projection 20 on the endless belt 17 positioned at the linear portion in the long ellipse shaped track, as shown in FIG. 8, so that cartridge 5 is positioned, and a relationship of relative position between the notch section 18 of the cartridge 5 and the projection 19 on the half arc portion in the long ellipse shaped track of the endless belt 17 is appropriately regulated.

Next, the CPU 21 of the controller 4 starts the pulse distribution processing with respect to the motor M2 functioning as the rotating body driving unit, and the guide rod 12, which is also a rotation shaft of the pulley 16, is driven to rotate so that the pulleys 16, 15 and the endless belt 17 are rotated in a counterclockwise direction in FIG. 8. Accordingly, the projection 19 on the endless belt 17 is fed to be moved toward the ejecting direction for the cartridge 5, that is, the projection slides from the right to the left in FIG. 8, and the projection 19 is certainly engaged with the notch section 18 of the cartridge 5 which is to be loaded so as to take out the cartridge 5 from the rack 2 along the linear portion in the long ellipse shaped track in a way of traction, and then the cartridge 5 which is to be loaded is taken in the cartridge housing container 10 (Steps S7-S8/a cartridge take-in control).

Figure 9:
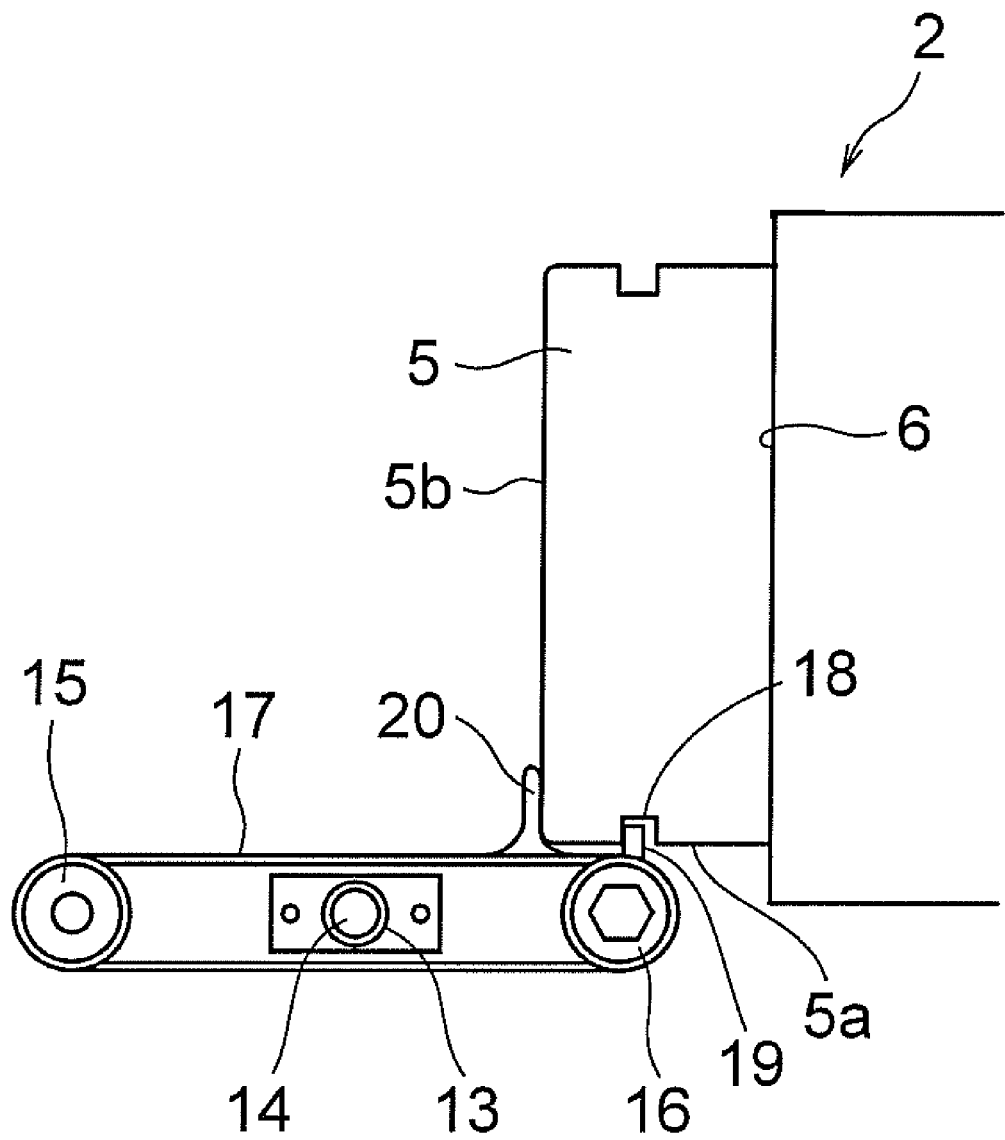
FIG. 9 is a diagram of an action principle showing a state where the projection on the endless belt starts to slide and is completely engaged with the notch section formed in the front end section of the cartridge.

The magnetic tape loader, in which a hook shaped picker is engaged with the notch section 18 for pulling out the cartridge 5, requires a stay or a pivot to support the picker, and in addition, an operation rod or a spring to swing the picker, in order to remove the picker from the notch section 18 of the cartridge 5. However, in the exemplary embodiment, as shown in FIGS. 8 and 9, when sliding to a position where the pulley 16 and the endless belt 17 are contacted with each other, the projection 19 is removed from the notch section automatically (refer to FIG. 8). Further, while the projection 19 is placed in the linear portion in the track drawn by the endless belt 17, the notch section 18 and the projection 19 are assured to be engaged certainly with each other. Therefore, this is advantageous in that an overall configuration can be more simplified compared to a case in which the cartridge 5 is pulled out with the hook shaped picker.

Further, unlike a case of the magnetic tape loader in which the hook shaped picker is engaged with the notch section 18 of the cartridge 5 to pull out the cartridge 5 at its front side, the exemplary embodiment is not necessary to dispose such as a stay or a pivot for supporting a picker, an operation rod or a spring for swinging the picker, and a pulling unit for pulling out the cartridge 5 using the picker in the cartridge housing container 10. All parts necessary to insert, eject or carry the cartridge 5, such as the pulleys 15, 16, and the endless belt 17, can be disposed outside the projection plane of the cartridge 5. Thus, the device can be downsized by reducing the depth size of the cartridge housing container 10 in the inserting/ejecting direction for the cartridge 5 (in a length of horizontal direction in FIG. 1).

Figure 10:
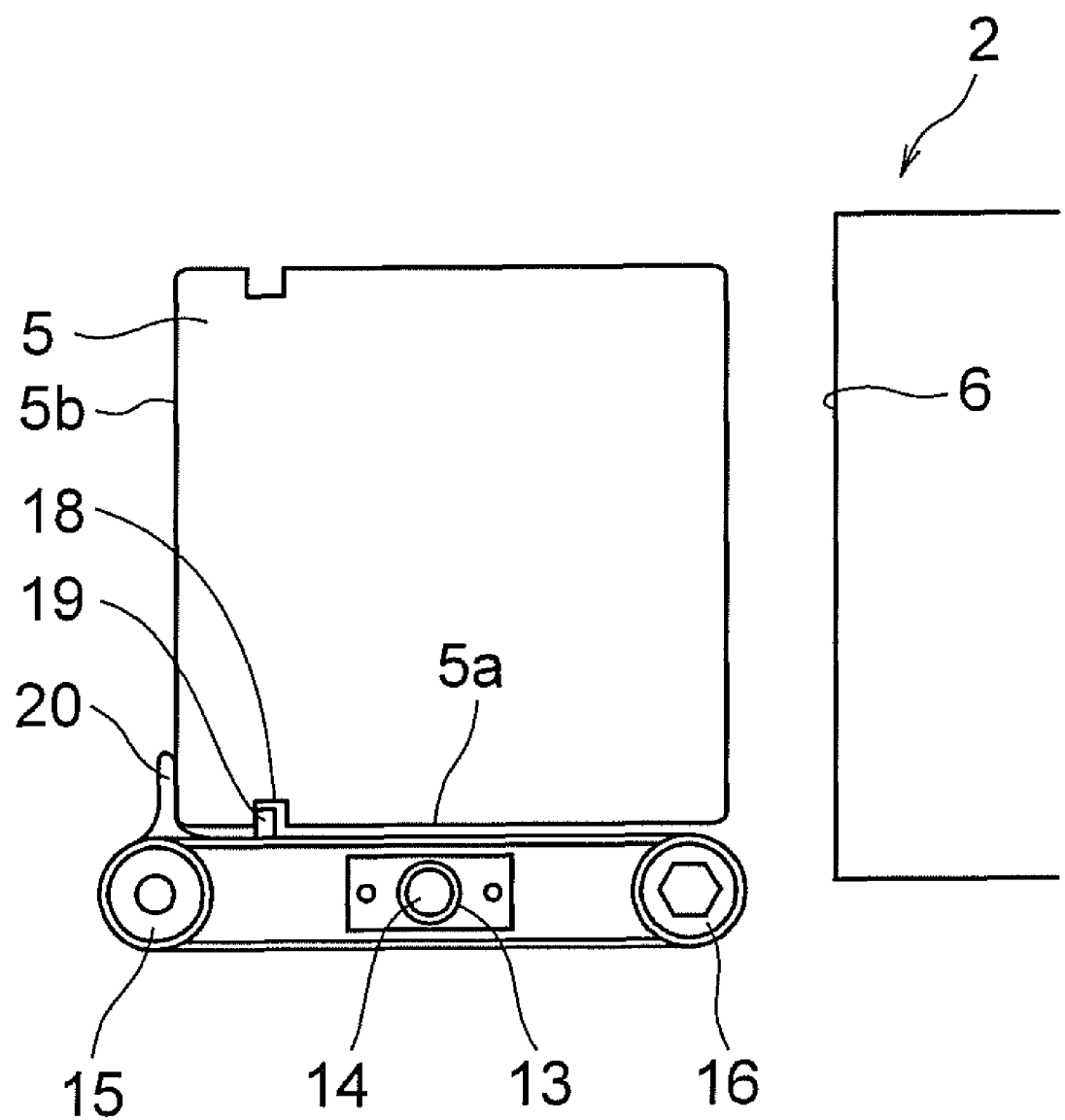
FIG. 10 is a diagram of an action principle showing a state where the projection on the endless belt completes sliding and the cartridge is completely taken into the cartridge housing container.

FIG. 10 shows a state where the pulse distribution processing is complete, and the projection 19 reaches a proper position for take-in completion, and then the cartridge 5 is completely taken into the cartridge housing container 10. When the cartridge 5 is completely taken in, the projection 19 and the auxiliary projection 20 are positioned in the linear portion of the long ellipse shaped track drawn by the endless belt 17, as shown in FIG. 10.

Next, the CPU 21 of the controller 4 obtains a rotation direction for the motor M1 and a number of drive command pulses, which are required for transferring the cartridge housing container 10 from the current position to a position of the magnetic tape drive 7, according to the positional information of the cartridge insertion/ejection opening 6 indicated by the load command (Step S9). The CPU 21 then starts the pulse distribution processing with respect to the motor M1 functioning as a container driving unit, and drives rotation of the ball screw 14 so as to feed the ball nut 13, which transfers the cartridge housing container 10 along two guide rods 11, 12 in the alignment direction of the cartridges 5, that is in the vertical direction in FIG. 1 to place it in front of the cartridge insertion/ejection opening 9 of the magnetic tape drive 7 (Steps S10-S11). After that, the CPU 21 starts the pulse distribution processing with respect to the motor M2 functioning as a rotating body driving unit to drive rotation of the guide rod 12, which is also the rotation shaft for the pulley 16, so as to rotate pulleys 15, 16 and the endless belt 17 in the clockwise in FIG. 10. Accordingly, the auxiliary projection 20 positioned on the endless belt 17 at the linear portion in the long ellipse shaped track pushes the end face 5b in the front side of the cartridge 5 to feed the cartridge 5 in the inserting direction, that is, from the left to the right in FIG. 10. Further, as shown in FIGS. 9 and 8 for example, the cartridge 5 in the cartridge housing container 10 is inserted into the cartridge insertion/ejection opening 9 of the magnetic tape drive 7 (Steps S12-S13/a cartridge inserting control).

After the pulse distribution processing is complete and the auxiliary projection 20 reaches a proper range of positions to complete delivery so that the cartridge 5 is completely delivered from the cartridge housing container 10, the positional relationship between the cartridge 5 and the cartridge insertion/ejection opening 9 of the magnetic tape drive 7 is being similar as a positional relationship between the cartridge 5 and the cartridge insertion/ejection opening 6 of the rack 2 shown in FIG. 8. At that point, the projection 19 is transferred to the position at the half arc portion in the long ellipse shaped track on the endless belt 17 and the projection 19 is automatically removed from the notch section 18 of the cartridge 5.

As above, after the cartridge 5 is delivered from the cartridge housing container 10 to the magnetic tape drive 7 completely, the CPU 21 of the controller 4 outputs a delivery completion signal to the magnetic tape drive 7 through the input/output circuit 25 (Step S14), and stays in a stand by state for waiting an input of an ejection completing signal from the magnetic tape drive 7 (Step S15).

Meanwhile, the magnetic tape drive 7 having received the delivery completion signal from the controller 4 pulls the cartridge 5 inserted in the cartridge insertion/ejection opening 9 into the mount position for the cartridge 5, and then reads out or writes in the data with respect to the magnetic tape in the cartridge 5 according to an instruction from the higher-level device.

When processes such as a write-in and a read-out data have been complete in the magnetic tape drive 7, the magnetic tape drive 7 unmounts the cartridge 5 to eject it and inputs the ejection completing signal into the CPU 21 of the controller 4 through the input/output circuit 25.

The cartridge 5 ejected from the magnetic tape drive 7 is supported by the auxiliary projection 20 on the endless belt 17 at the end face 5b in its front side, as well as the case in FIG. 8, so that a relationship of relative position between the notch section 18 of the cartridge 5 and the projection 19 on the endless belt 17 is appropriately regulated.

Upon detecting an input of the ejection completing signal so as to confirm completing operation in the magnetic tape drive 7, the CPU 21 starts the pulse distribution processing with respect to the motor M2 functioning as a rotating body driving unit. Accordingly, the CPU 21 drives rotation of the guide rod 12, which is also the rotation shaft for the pulley 16, so as to rotate the pulleys 16, 15 and the endless belt 17 in the counterclockwise in FIG. 8, and then the projection 19 of the endless belt 17 is fed in the ejection direction for the cartridge 5, that is from the right to the left in FIG. 8. Then, the projection 19 engages certainly with the notch section 18 of the cartridge 5 as shown in FIG. 9 to take out the cartridge 5 from the magnetic tape drive 7 in a traction manner, and the used cartridge 5 is taken into the cartridge housing container 10 (Steps S16-S17/a cartridge collecting control).

FIG. 10 shows a state where the pulse distribution processing is complete and the projection 19 reaches a proper range for take-in completion, and the used cartridge 5 is completely taken into the cartridge housing container 10.

Next, the CPU 21 of the controller 4 obtains a rotational direction of the motor M1 and a number of drive command pulses both of which are required for transferring the cartridge housing container 10 from the current position to a position of the cartridge insertion/ejection opening 6, according to positional information on the cartridge insertion/ejection opening 6 designated by the load command, that is information on an original location of the cartridge 5 currently housed in the cartridge housing container 10 (Step S18). The CPU 21 then starts the pulse distribution processing with respect to the motor M1 functioning as a container driving unit, and drives rotation of the ball screw 14 so as to feed the ball nut 13. Accordingly, the cartridge housing container 10 travels along two guide rods 11, 12 in the alignment direction of cartridges 5, that is, in the vertical direction in FIG. 1, to be positioned in front of the cartridge insertion/ejection opening 6 to which the cartridge 5 is to be returned (Steps S19-S20/a cartridge housing approach control). The CPU 21 makes a current position storing register in the nonvolatile memory 24 update and store the current position of the cartridge housing container 10 (Step S21).

Next, the CPU 21 of the controller 4 starts the pulse distribution processing with respect to the motor M2 functioning as the rotating body driving unit. The CPU 21 then drives rotation of the guide rod 12, which is also the rotation shaft for the pulley 16, so as to rotate the pulleys 16, 15 and the endless belt 17 in the clockwise in FIG. 10. While the auxiliary projection 20 on the endless belt 17 pushes the end face 5b in the front side of the cartridge 5, the cartridge 5 is fed toward a direction to be inserted, that is, from the left to the right in FIG. 10. Accordingly, as shown in FIGS. 9 and 8, the cartridge 5 in the cartridge housing container 10 is inserted into the cartridge insertion/ejection opening 6 of the rack 2 to which the cartridge 5 is to be returned (Steps S22-S23/a cartridge housing control).

As described above, the cartridge 5 inserted into the cartridge insertion/ejection opening 6 of the rack 2 is pulled into the lock position within the cartridge insertion/ejection opening 6 by the set and release mechanism 28, and fixed at the lock position. FIG. 2 shows a state where the cartridge 5 is fixed in the lock position.

Each section of the magnetic tape library 1 is restored to its initial state by the above mentioned series of sequence controls, which allows another cartridge 5 to be picked up from the rack 2 and carried.

The rack 2 and the magnetic tape drive 7 in this exemplary embodiment includes functions of taking in the cartridge 5 inserted in the cartridge insertion/ejection openings 6, 9, and releasing the cartridge 5 fixed in the lock position or the mount position so as to push out the cartridge 5 to the delivery position. Therefore, the auxiliary projection 20 to push the end face 5b of the cartridge 5 is not essential and the cartridge 5 can be swapped between the cartridge insertion/ejection openings 6, 9 and the cartridge housing container 10 only by the projection 19.

That is, in this exemplary embodiment, the auxiliary projection 20 functions almost exclusively as a positioning unit for supporting the end face 5b of the cartridge 5 ejected from the cartridge insertion/ejection openings 6, 9 and positioning the notch section 18 of the cartridge 5 precisely with respect to the projection 19. The rack 2 is provided many cartridge insertion/ejection openings 6, and in some case, ejected positions of the cartridges 5 ejected from respective cartridge insertion/ejection openings 6 are varied, due to adjustment problem of a device or variation across the ages. In another case, the cartridge 5 ejected from the cartridge insertion/ejection opening 9 of the magnetic tape drive 7 does not always stop at a corresponding position as the cartridge 5 ejected from the cartridge insertion/ejection opening 6 of the rack 2. However, because the auxiliary projection 20 supports the end face 5b of the cartridge 5 ejected from the cartridge insertion/ejection openings 6 and 9 and positions the notch section 18 of the cartridge 5 precisely with respect to the projection 19, the projection 19 can be engaged with the notch section 18 certainly so as to swap the cartridge 5.

As for the rack 2 including a plurality of cartridge insertion/ejection opening 6 for housing the cartridges 5 aligned in a thickness direction, a spring system latch mechanism is already known, other than the above mentioned embodiment, in which a manual operation is used instead of the set and release mechanism 28. Normally, in this kind of the rack 2, the cartridge 5 is pushed against a spring power into a farther position than the regular position so as to be fixed at the lock position within the cartridge insertion/ejection opening 6, and the cartridge 5 is again pushed farther than the regular position so as to release the lock, and is ejected by the power of the spring power.

Figure 7:
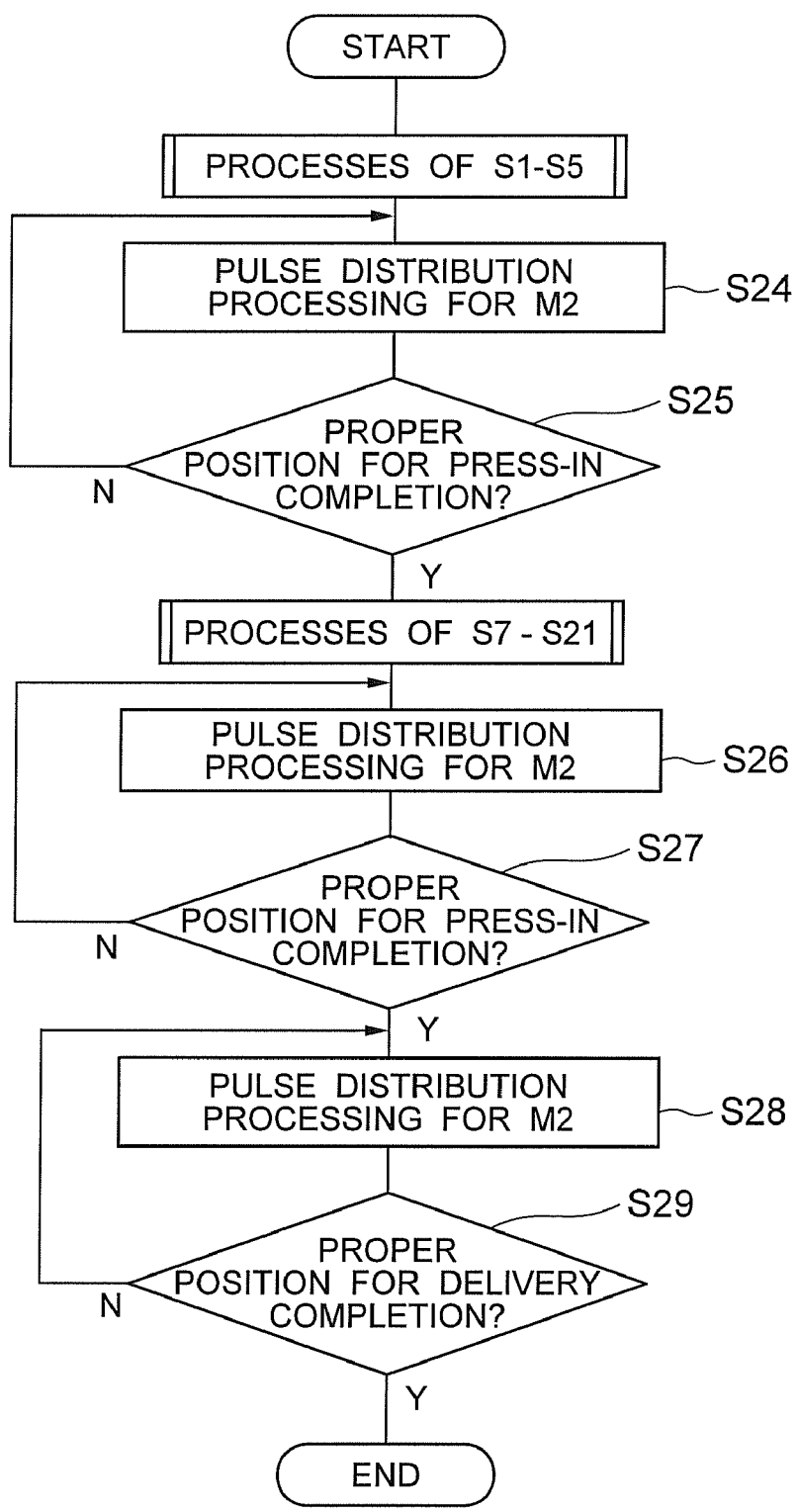
FIG. 7 is a flowchart showing overall drive control for the magnetic tape loader in a case where the rack adopts a spring latch mechanism instead of a set and release mechanism.

An exemplary embodiment for drive control of the magnetic tape loader 3 employing the rack 2 having the above construction will be explained with reference to FIG. 7. A construction of the hardware is the same as the one explained with reference to FIGS. 1-3, but this is different from the aforementioned exemplary embodiment in that the rack 2 does not include the set and release mechanism 28.

The operation is performed, as well as the processing in Steps S1-S5 described in FIG. 4, until positioning the cartridge housing container 10 in front of the cartridge insertion/ejection opening 6 designated by the higher-level device.

Figure 11:
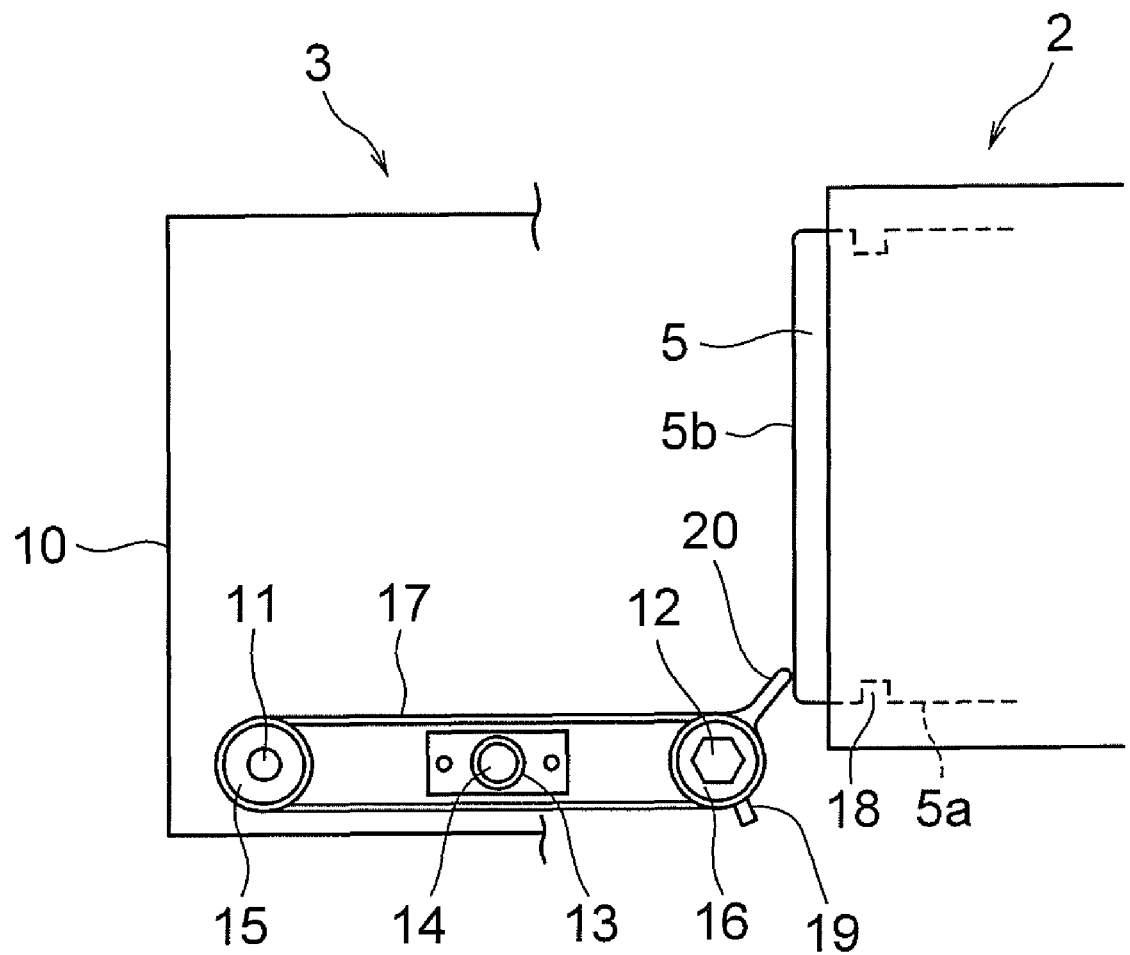
FIG. 11 is a diagram of an action principle showing an inserting/ejecting principle for the cartridge in a case where the rack adopts the spring latch mechanism instead of the set and release mechanism.

After the pulse distribution processing (refer to Steps S4-S5) relating to the cartridge obtaining approach control is complete and the cartridge housing container 10 reaches in a proper range of positions at the designated cartridge insertion/ejection opening 6, the CPU 21 of the controller 4 starts the pulse distribution processing with respect to the motor M2 functioning as a rotating body driving unit, and drives rotation of the guide rod 12, which is also a rotation shaft of the pulley 16, so as to rotate the pulleys 16, 15 and the endless belt 17 in the clockwise in FIG. 2, and slide the auxiliary projection 20 on the endless belt 17 from the initial position shown in FIG. 2 toward the inserting position for the cartridge 5. The auxiliary projection 20 pushes the end face 5b in the front side of the cartridge 5 as shown in FIG. 11 so as to slide the cartridge 5 from the regular position shown in FIG. 2 to the press-in completion position in FIG. 11. Then, the spring latch mechanism provided at the cartridge insertion/ejection opening 6 is unlocked (Steps S24-S25).

Next, in the pulse distribution processing concerning to a cartridge take-in control (refer to Steps S7-S8), the CPU 21 of the controller 4 starts the pulse distribution processing with respect to the motor M2 functioning as a rotating body driving unit and drives rotation of the guide rod 12, which is also a rotation shaft for the pulley 16, so as to rotate the pulleys 16, 15 and the endless best 17 in the counterclockwise in FIG. 11. Accordingly, the auxiliary projection 20 on the endless belt 17 is fed in the cartridge 5 ejecting direction, that is, from the right to the left in FIG. 11, and the cartridge 5 urged by the spring power in the rack mechanism is gradually projected to be ejected from the cartridge insertion/ejection opening 6 of the rack 2 while the auxiliary projection 20 is contacted to the end face 5b. Finally, a relationship of relative position between the auxiliary projection 20 and the cartridge 5, that is, a relationship of relative position between the projection 19 and the notch section 18 is appropriately regulated in the state of FIG. 8.

Therefore, in the same manner as the aforementioned exemplary embodiment, it is possible to engage the projection 19 with the notch section 18 of the cartridge 5 which is to be loaded certainly, take out the cartridge 5 from the rack 2 with the projection 19 in a traction manner to be taken in the cartridge housing container 10.

In this exemplary embodiment, as well as the aforementioned exemplary embodiment, the cartridge housing container 10 having the cartridge 5 which is to be loaded travels and delivers the cartridge 5 to the magnetic tape drive 7 to perform write-in or read-out data, and the cartridge 5 with which write-in or read-out is complete is taken into the cartridge housing container 10 from the magnetic tape drive and the cartridge housing container 10 travels to a position of the cartridge insertion/ejection opening 6 to which the cartridge 5 is to be returned (refer to Step S0 in FIG. 4-S*tep* S21 in FIG. 5).

Next, the CPU 21 of the controller 4 starts the pulse distribution processing with respect to the motor M2 functioning as the rotating body driving unit, and drives rotation of the guide rod 12, which is also the rotation shaft for the pulley 16, so as to rotate the pulleys 16, 15 and the endless belt 17 in the clockwise in FIG. 10. While the auxiliary projection 20 on the endless belt 17 pushes the end face 5b in the front side of the cartridge 5, the cartridge 5 is fed in the inserting direction, that is, from the left to the right in FIG. 10, and as shown in FIGS. 9 and 8, the cartridge 5 in the cartridge housing container 10 is inserted into the cartridge insertion/ejection opening 6 in the rack 2 to which the cartridge 5 is to be returned. Further, the auxiliary projection 20 is slid to the right side beyond the initial position of the projection 20 shown in FIG. 8, by the drive of the motor M2, and the auxiliary projection 20 on the endless belt 17 pushes, as shown in FIG. 11, the end face 5b in the front side of the cartridge 5 to slide farther the cartridge 5 into the press-in completion position beyond the aforementioned regulated position. Then, the spring latch mechanism in the cartridge insertion/ejection opening 6 of the rack 2 is operated to fix the cartridge 5 at the lock position within the cartridge insertion/ejection opening 6 (Steps S26-S27).

Sequentially, the CPU 21 of the controller 4 starts the pulse distribution processing inverting the rotational direction of the motor M2 functioning as the rotating body driving unit, and drives rotation of the guide rod 12, which is also the rotation shaft of the pulley 16, so as to rotate the pulleys 16, 15 and the endless belt 17 in the counterclockwise in FIG. 11. Then, while the cartridge 5 remains in the cartridge insertion/ejection opening 6, the projection 19 and the auxiliary projection 20 on the endless belt 17 are restored to those initial positions shown in FIG. 2 (Steps S28-S29).

According to the above mentioned series of sequence controls, each section of the magnetic tape library 1 is restored to its initial state, which allows another cartridge 5 to be taken out and carried from the rack 2.

In this exemplary embodiment, the auxiliary projection 20 functions as a positioning unit for supporting the end face 5b of the cartridge 5 ejected from the cartridge insertion/ejection opening 6 or 9, and positioning precisely the notch section 18 of the cartridge 5 with respect to the projection 19 so that the cartridge 5 can be taken out accurately from the cartridge insertion/ejection opening 6 or 9, and in addition, the auxiliary projection 20 functions as a unit for achieve the lock/unlock operation with respect to the cartridge 5 by the spring latch mechanism provided respective cartridge insertion/ejection openings 6 of the rack 2.

Hereinbefore, one example of configurations has been explained where the projection 19 on the endless belt 17 wrapped around the pulleys 15, 16 disposed outside the end face 5a in the width direction of the cartridge 5 is engaged with the notch section 18 formed in the nearer side of the end face 5a facing in the width direction of the cartridge 5 so as to take out and insert the cartridge 5. However, another construction may be possible where the pulleys 15, 16 and the endless belt 17 are supported by a rotation shaft which is disposed outside an end face facing in the thickness direction of the cartridge 5 and is parallel to the width direction of the cartridge 5, and the projection 19 on the endless belt 17 is engaged with the notch section 18 formed in the front side end section of the end face facing in the thickness direction of the cartridge 5 so as to take out and insert the cartridge 5.

Figure 12:
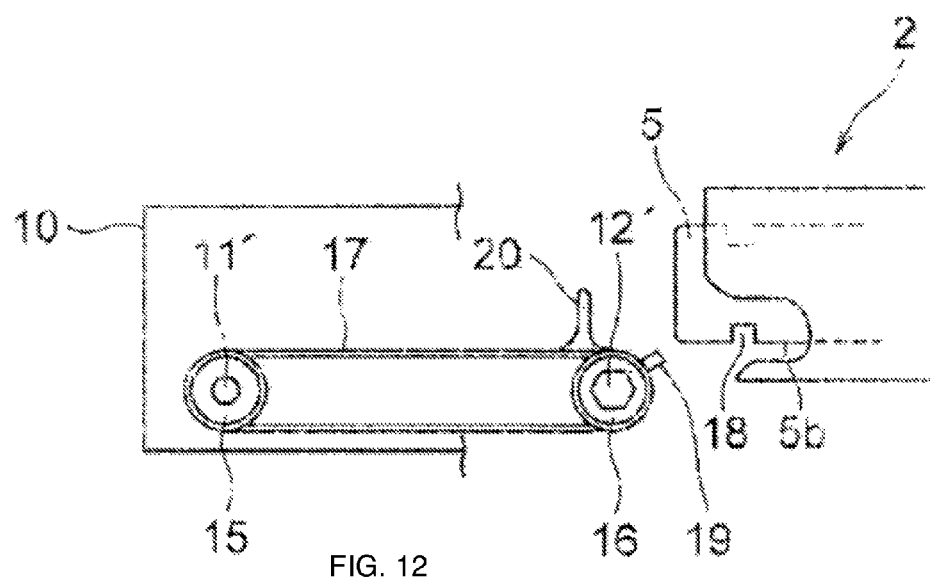
FIG. 12 is a partial side sectional view showing a positional relationship between the rack and the magnetic tape loader disposed in the magnetic tape library of an exemplary embodiment.

For example, a construction can be possible where two rotation shafts 11' and 12' are disposed near a bottom surface of the cartridge housing container 10 as shown in FIG. 12 along the inserting/ejecting direction for the cartridge 5, with an interval between two of the rotation axes, and the pulleys 15, 16 are attached thereon. The projection 19 on the endless belt 7 wrapped around the pulleys 15, 16 is engaged with the notch section 18 formed in the front end portion of an end face 5b facing in the thickness direction, that is, in the front end portion of the end face facing in the bottom surface of the cartridge 5 so as to take out and insert the cartridge 5. In this case, a sectional side view of the cartridge housing container 10 viewed from the under side on the surface of the paper of FIG. 1 has the same configuration as the partial plan cross sectional view in FIG. 2 (It means that the end face 5a facing in the width direction of the cartridge 5 shown in FIG. 2 is recognized as a bottom surface of the cartridge 5).

In this case, two of the rotation shafts 11' and 12' required to support the pulleys 15, 16 are rotation shafts parallel to the width direction of the cartridge 5, and those rotation shafts 11' and 12' intersect with the guide rods 11, 12 at 90 degrees. Accordingly, the guide rods 11, 12 cannot be utilized as rotation shafts for the pulleys 15, 16. Therefore, it is necessary to dispose two rotation shafts 11' and 12' additionally inside the cartridge housing container 10 other than the guide rods 11, 12, and to drive rotation of either one of rotation shafts, that is, the rotation shaft 12' having the driven pulley 16 fixed thereon unrotatably, by the motor M2 fixed in the cartridge housing container 10.

Since downsizing a device and simplifying a construction are being main parts of an object in the exemplary embodiments above, the example has been described about the pulleys 15, 16 and the endless belt 17 disposed in the side of the end face 5a in the width direction of the cartridge 5, or the end face 5b in the thickness direction (in the bottom surface, for example) of the cartridge 5. However, when the downsizing a device or simplifying a construction are not significant object, the pulleys 15, 16, and the endless belt 17 may be disposed symmetrically in both end faces in the width direction of the cartridge 5, or in the thickness direction of the cartridge 5.

In this case, two of the rotation shafts required to support the pulleys 15, 16 are rotation shafts parallel to the width direction of the cartridge 5, and those rotation shafts intersect with the guide rods 11, 12 at 90 degrees. Accordingly, the guide rods 11, 12 cannot be utilized as rotation shafts for the pulleys 15, 16. Therefore, it is necessary to dispose two rotation shafts additionally inside the cartridge housing container 10 other than the guide rods 11, 12, and to drive rotation of either one of rotation shafts, that is, the rotation shaft having the driven pulley 16 fixed thereon unrotatably, by the motor M2 fixed in the cartridge housing container 10.

Since downsizing a device and simplifying a construction are being main parts of an object in the exemplary embodiments above, the example has been described about the pulleys 15, 16 and the endless belt 17 disposed in the side of the end face 5a in the width direction of the cartridge 5, or the end face in the thickness direction (in the bottom surface, for example) of the cartridge 5. However, when the downsizing a device or simplifying a construction are not significant object, the pulleys 15, 16, and the endless belt 17 may be disposed symmetrically in both end faces in the width direction of the cartridge 5, or in the thickness direction of the cartridge 5.

Further, instead of the endless belt 17 and the pulleys 15, 16 having wheel teeth which are made from the synthetic rubber, the flexible plastic or the like, various machine elements utilized in a belt transmission device, for example, a combination of a flexible circular body such as a plane belt, a V-belt, a rope, and the like and a plane pulley, a grooved pulley, a rope pulley, and the like may be used. Alternatively, a combination of a circular body such as a chain, a roller chain, and the like, to which a link plate and pin formed of rigid bodies are provided to be flexible as a whole, and a sprocket and the like may be utilized.

FIG. 1 shows the construction where the cartridge housing container 10 travels between the rack 2 which houses the cartridges 5 piled in the thickness direction and the magnetic tape drive 7 disposed over the rack 2. It is also already known that a rack for housing the cartridges 5 aligned in the horizontal direction, a rack for housing the cartridges 5 aligned two-dimensionally in the horizontal and vertical directions, and a rack for housing the cartridges 5 aligned three-dimensionally in the horizontal and vertical directions and a depth direction, and the configuration of main portion of the magnetic tape loader 3 in the aforementioned exemplary embodiments, specifically, the cartridge housing container 10, pulleys 15, 16, and the endless belt 17 on which the projection 19, 20 are fixed can be applied as it is to a magnetic tape library including those kind of racks to achieve objects such as downsizing a device, preventing slipping on conveying operation, reducing a size in the depth direction, and the like. It is already known that various container driving units for feeding the cartridge housing container 10 in the horizontal direction or feeding in the horizontal and vertical directions so as to transfer the container between a rack and a neighboring storage playback device, and any type of the configuration may be applicable.

In the same manner, the configuration of the main portion of the magnetic tape loader 3 in the aforementioned exemplary embodiment, that is, the cartridge housing container 10, the pulleys 15, 16, and the endless belt 17 having the projections 19 and 20 thereon can be applied as it is to, as well as the cartridge incorporating the magnetic tape, a cartridge incorporating a storage medium such as an optical disc, MO, and the like, or, a library device including a rack which houses a casing and provided a storage playback device therefore.

As above, according to the exemplary embodiments of the present invention, the projection, fixed on the surface of the circular body wrapped around two rotating bodies which are provided in the cartridge housing container along the inserting/ejecting direction for the cartridge with having an interval in between, is positioned at an outer circumference of the rotating body near the cartridge insertion/ejection openings of the rack and the storage playback device, that is, at the half arc portion in the track drawn by the circular body wrapped around two of the rotating bodies. In that state, the projection is engaged with the notch section formed in the cartridge in the rack or the storage playback device, and at least one of rotating bodies is driven to rotate by the rotating body driving unit, so that the projection engaged with the notch section of the cartridge is driven along the linear portion of the track drawn by the circular body wrapped around the two rotating bodies, that is, the long ellipse shaped track extending in the inserting/ejecting direction for the cartridge, toward the cartridge ejecting direction, so that the cartridge is pulled out from the rack or the storage playback device and housed into the cartridge housing container. Meanwhile, the rotating body driving unit drives rotation of the rotating bodies in the opposite direction with respect to the above so that the projection engaged with the notch section of the cartridge is driven along the linear portion of the long ellipse shaped track extending in the cartridge inserting/ejecting direction toward the cartridge inserting direction, and the cartridge within the cartridge housing container can be inserted into the rack or the storage playback device. Therefore, unconsidered slippage on the cartridge inserting/ejecting or carrying between the cartridge housing container and the rack, and between the cartridge housing container and the storage playback device, can be certainly prevented.

As described, the configuration includes the projection sliding toward the cartridge inserting/ejecting direction so as to insert/eject or carry a cartridge between the cartridge housing container and the rack, and between the cartridge housing container and the storage playback device. Accordingly, slippage does not occur during the cartridge inserting/ejecting or carrying. Therefore, there is no need to dispose in the cartridge housing container anything other than a set of the circular body having a projection and two rotating bodies, disposed at one position being outside the projection plane, and the set is no need to be disposed symmetrical positions with respect to the cartridge. Thus, the configuration can be simplified, which allows the devices to be produced at a low cost, and in addition, assemblies and alignment works can be also simplified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A cartridge carrying apparatus for carrying a cartridge, with traveling reciprocatory between a rack which houses aligned cartridges incorporating a storage medium and a storage playback device disposed near the rack, the cartridge carrying apparatus comprising:
    a cartridge housing container disposed to be capable of traveling between a position in front of the rack and a position in front of the storage playback device to be close to cartridge insertion/ejection openings of the rack and the storage playback device, and including an opening in a surface facing the rack and the storage playback device;
    two rotating bodies set outside a projection plane of the cartridge and disposed within the cartridge housing container along an inserting/ejecting direction for the cartridge, and having an interval between the rotating bodies;
    a circular body having substantial flexibility, wrapped around the rotating bodies;
    a projection rigidly fixed on a surface of the circular body to be engaged with a notch section formed in a front end portion of the cartridge which is to be ejected from the rack or the storage playback device by being fed to be moved toward an ejecting direction for the cartridge with respect to the circular body, while positioned on outer circumference of a rotating body closer to the cartridge insertion/ejection openings of the rack and the storage playback device with a position of a tip of the projection which is placed slightly outside a projection plane of the cartridge to be along a radial direction of the rotating body so as not to touch an end face of the cartridge as an initial position;
    a rotating body driving unit for driving rotation of at least one of the rotating bodies; and
    a container driving unit for transferring the cartridge housing container between the rack and the storage playback device.

2. The cartridge carrying apparatus, as claimed in claim 1, wherein
    each of the rotating bodies is set outside an end face of the cartridge facing in a width direction and is supported by a rotation shaft parallel to a thickness direction of the cartridge, and
    the projection engages with the notch section formed in the front end portion of an end face facing in the width direction of the cartridge to be ejected from the rack or the storage playback device.

3. The cartridge carrying apparatus, as claimed in claim 1, wherein
    each of the rotating bodies set outside an end face of the cartridge facing in the thickness direction and is supported by a rotation shaft parallel to the width direction of the cartridge, and
    the projection engages with the notch section formed in the front end portion of an end face facing in the thickness direction of the cartridge to be ejected from the rack or the storage playback device.

4. The cartridge carrying apparatus, as claimed in claim 1, wherein
    an auxiliary projection is arranged on a surface of the circular body, wherein the auxiliary projection contacts a front end face in the cartridge inserting/ejecting direction while the projection engages with the notch section.

5. The cartridge carrying apparatus, as claimed in claim 1, comprising a controller for drive control of the rotating body driving unit and the container driving unit, wherein
    the controller performs sequentially:
    a cartridge obtaining approach control for operating the container driving unit so as to transfer the cartridge housing container to a cartridge housing position designated by a higher-level device;
    a cartridge take-in control for operating the rotating body driving unit in such a direction that the projection on the circular body slides in the cartridge ejecting direction, so that the cartridge is taken into the cartridge housing container from the rack;
    a cartridge insert control for operating the container driving unit so as to transfer the cartridge housing container to a position of the storage playback device, and operating the rotating body driving unit to slide the projection on the circular body in the cartridge inserting direction so that the cartridge is inserted from the cartridge housing container to the storage playback device;
    a cartridge retrieving control for operating the rotating body driving unit to slide the projection on the circular body in the cartridge ejecting direction after completion of the operation in the storage playback device, so that the cartridge is taken into the cartridge housing container from the storage playback device;
    a cartridge housing approach control for operating the container driving unit so as to transfer the cartridge housing container to the designated cartridge housing position; and
    a cartridge housing control for operating the rotating body driving unit to slide the projection on the circular body in the cartridge inserting direction, so that the cartridge is inserted into the rack from the cartridge housing container.

6. The cartridge carrying apparatus, as claimed in claim 5, wherein the controller outputs a cartridge release command, between performing the cartridge obtaining approach control and performing the cartridge take-in control so that a head of the cartridge projects from the rack.

7. The cartridge carrying apparatus, as claimed in claim 5, wherein the controller operates the rotating body driving unit to slide the projection on the circular body in the cartridge inserting direction, between performing the cartridge obtaining approach control and performing the cartridge take-in control, so that the cartridge is pushed into the rack, which leads to release a lock between the cartridge and the rack, and the head of the cartridge projects from the rack.

8. The cartridge carrying apparatus, as claimed in claim 7, wherein the controller operates the rotating body driving unit to slide the projection on the circular body in the cartridge inserting direction so that the cartridge is pushed into the rack beyond the regulated position, which leads to lock the cartridge in the rack.

9. A cartridge carrying method for inserting/ejecting a cartridge to/from each cartridge insertion/ejection opening of a rack which houses aligned cartridges incorporating a storage medium and a storage playback device, the cartridge carrying method comprising:

disposing a circular body in front of a cartridge insertion/ejection opening, at outside a projection plane of the cartridge, the circular body having a projection on a surface thereof, moving along a long ellipse shaped track extending in an inserting/ejecting direction for the cartridge, and having a substantial flexibility;

moving the circular body in such a direction that the projection slides in the ejecting direction of the cartridge from the position at a half arc portion of the long ellipse shaped track near the cartridge insertion/ejection opening where a tip of the projection is placed slightly outside a projection plane of the cartridge to be along a radial direction of the half arc portion so as not to touch an end face of the cartridge, and engaging the projection with a notch section formed in a nearer side end portion of the cartridge projecting from the cartridge insertion/ejection opening so as to take out the cartridge from the cartridge insertion/ejection opening and carry it out along a linear portion of the long ellipse shaped track; and moving the circular body in such a direction that the projection on the linear portion of the long ellipse shaped track slides in the inserting direction of the cartridge, and moving and feeding the cartridge by the projection engaged with the notch section to insert the cartridge into the cartridge insertion/ejection opening, and removing the projection from the notch section.

10. A cartridge carrying method for inserting/ejecting a cartridge to/from each cartridge insertion/ejection opening of a rack which houses aligned cartridges incorporating a storage medium and a storage playback device, the cartridge carrying method comprising:

disposing a circular body in front of a cartridge insertion/ejection opening, at outside a projection plane of the cartridge, the circular body having a projection and an auxiliary projection which is longer than the projection on a surface thereof, moving along a long ellipse shaped track extending in an inserting/ejecting direction for the cartridge, and having a substantial flexibility;

projecting the cartridge from the cartridge insertion/ejection opening with the projection being positioned at a half arc portion near the cartridge insertion/ejection opening in the long ellipse shaped track, a tip of the projection being slightly outside a projection plane of the cartridge to be along a radial direction of the half arc portion so as not to touch an end force of the cartridge, and the auxiliary projection being at a linear portion in the long ellipse shaped track, and positioning a notch section formed in a front end portion of the cartridge, with supporting the cartridge at the front end face in the inserting/ejecting direction by the auxiliary projection;

moving the circular body in such a direction that the projection slides in the ejecting direction of the cartridge, and engaging the projection with a notch section formed in a nearer side end portion of the cartridge projecting from the cartridge insertion/ejection opening so as to take out the cartridge from the cartridge insertion/ejection opening and carry it out along a linear portion of the long ellipse shaped track; and moving the circular body in such a direction that the projection and the auxiliary projection on the linear portion of the long ellipse shaped track slides in the inserting direction of the cartridge, and moving and feeding the cartridge by the auxiliary projection contacted with a front end face in the cartridge inserting/ejecting direction so as to insert the cartridge into the cartridge insertion/ejection opening, and removing the projection from the notch section.

* * * * *